Sept. 30, 1969    M. E. SALLACH    3,470,358
APPARATUS AND METHOD FOR CIRCUIT CONTROL FROM STORED DATA
Filed Feb. 18, 1966    2 Sheets-Sheet 1
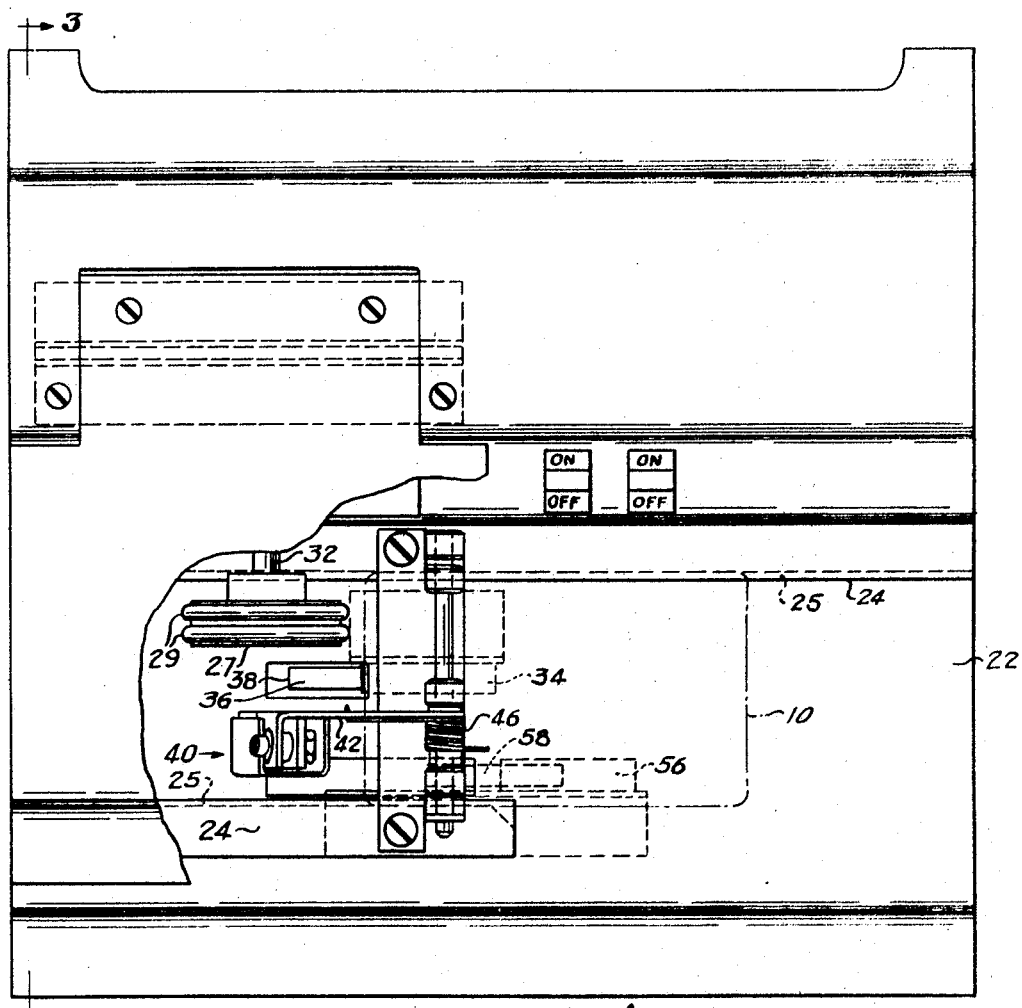
Fig.1
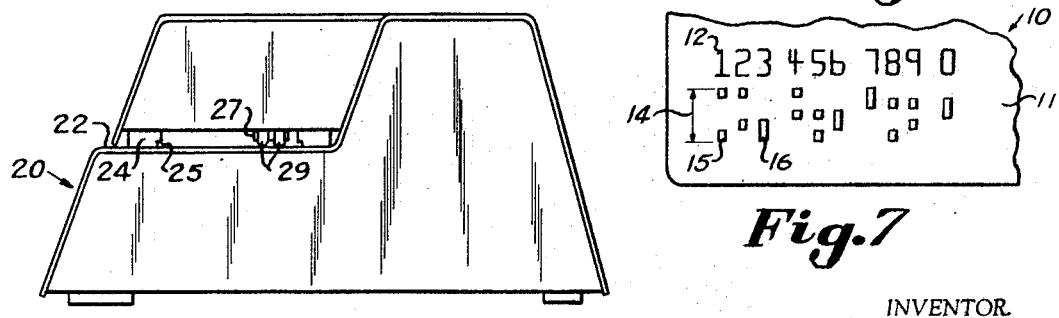
Fig.2
Fig.7
INVENTOR.
MAX E. SALLACH
BY Ray S Pyle
ATTORNEY.

INVENTOR.
MAX E. SALLACH
BY Ray S Pyle
ATTORNEY.

United States Patent Office 3,470,358
Patented Sept. 30, 1969

3,470,358
APPARATUS AND METHOD FOR CIRCUIT CONTROL FROM STORED DATA
Max E. Sallach, Chesterland, Ohio, assignor to Addressograph-Multigraph Corporation, Cleveland, Ohio, a corporation of Delaware
Filed Feb. 18, 1966, Ser. No. 528,446
Int. Cl. G06k 7/01
U.S. Cl. 235—61.11                    8 Claims

ABSTRACT OF THE DISCLOSURE

A device for sensing physical variations of a data card surface employing the principle of a moving card and a sensing head carriage riding that card. A sensing device on the carriage scans the card. Factors of thickness of variation in card surface are eleminated by reason of the provision of placing the scanning head carriage to ride on the surface of the card.

---

This invention relates in general to devices for sensing data from a storage source, and more particularly to apparatus for a system in which surface irregularities of a mechanical storage media are sensed.

Business machine cards for data storage are well known, and credit cards are now often embossed or otherwise marked and conditioned to carry data which may be imprinted directly upon a billing or other form, to be read therefrom by a sensing device.

This invention has for its basic premise and object the concept of using a permanent source, such as a customer's credit card, as a means for directly controlling a remote station information center or record container, such as a computer without an intervening imprint, and for doing so by means of sturdy simple low-cost sensing equipment of such nature that its use at many locations by untrained operators is practical and economically feasible.

As one example of the utility of this invention, the sensing of card information is done for the purpose of receiving back credit information concerning the holder of the card. For example, credit card information may be transmitted from a remote station to a central station and the central station may then send back authorization for a sale, and possibly actually transfer funds from one account to another at the central station, based on the information thus given. This is a utility example only, and not a limit to the usefulness of this invention.

However, such a basic concept requires the provision of machines capable of reading the information source at a low cost. The machines must be fool-proof in order that persons of all temperament and degrees of intelligence may use the machines without extensive instruction of operation, and the machine must be virtually indestructible.

Therefore, an object of this invention is to provide a very low-cost, but fully reliable device for a read-out of data from a mechanical storage medium with data in the form of surface variations.

Another object of this invention is to provide such device fully self-contained and requiring no selective operator control or assistance.

Let another object of this invention is to relate a card read-out device sensor head to a reference surface portion of a card in the device, to establish a reference from which surface variation may be sensed.

In accordance with these and other objects which will become apparent hereinafter, the best mode contemplated for the present invention is disclosed in the accompanying drawing wherein:

FIGURE 1 is a top plan view of a sensor read-out unit, with parts of the shielding housing broken away to reveal internal structure;

FIGURE 2 is an elevation of the card entrance end of the unit;

FIGURE 7 is a fragmentary portion of a credit card embodying bar code embossed surfaces.

Figure 3:
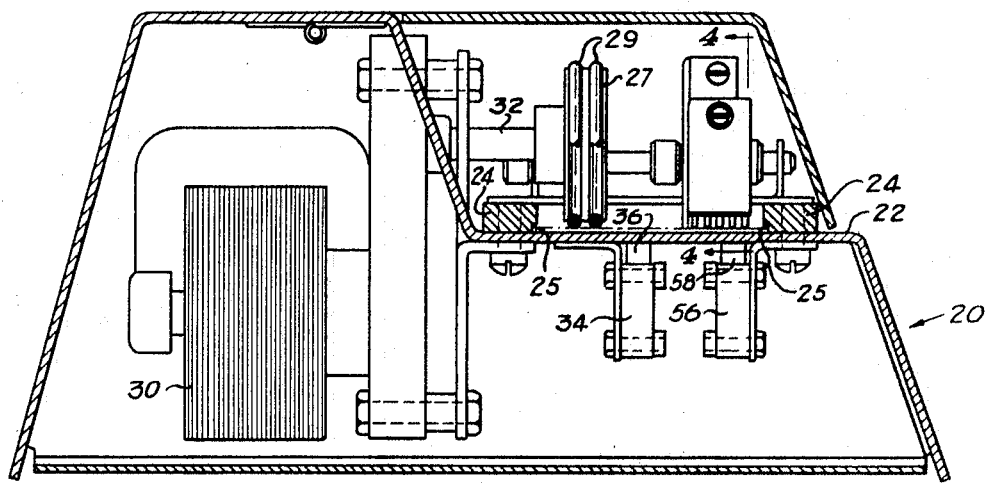
FIGURE 3 is a section through the housing of the unit taken along line 3—3 of FIGURE 1 revealing the internal structure in elevation.
Figure 4:
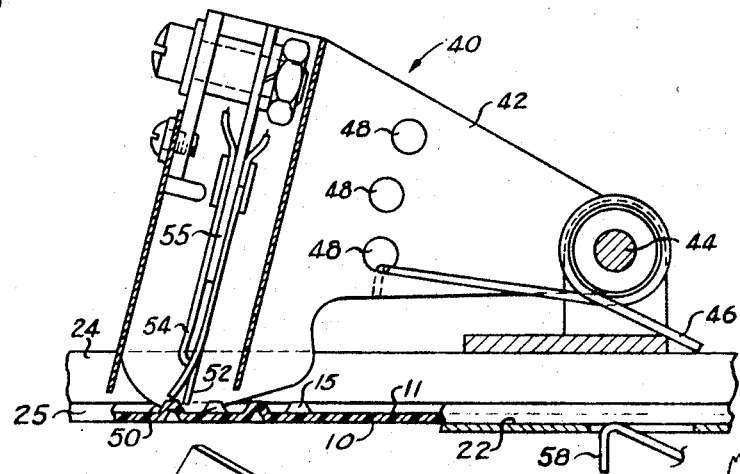
FIGURE 4 is an enlarged detail of a sensor head and carriage as viewed substantially from the line 4—4 of FIGURE 3.

Referring to the drawings, the reference character 10 in FIGURE 7 indicates a portion of a credit card having a smooth, planar surface 11 with identification symbols 12, which are numerical symbols in this illustration.

An arbitrary portion of the card surface aligned with each symbol is reserved for embossing of a code representing the particular symbol. This card portion will be referred to as a column, although the column is not all embossed or otherwise employed. The length of column used is about ¼″ in actual practice, and is indicated by dimension bracket 14 in FIGURE 7.

In one common card code system, which has been selected for illustration of this invention, the column is divided into five possible portions, and two out of the five are embossed in order to provide a code representative of the particular symbols. The use of this embossed code at the time of this invention has been to serve as a printing plate for imprinting a charge form with both human and machine sensible printing.

The length of the column is limited because it is desired to keep the necessary size of the printed form to a minimum.

The column area associated with each of the symbols 12 is divided into a plurality of segments, and each segment may be altered from the planar surface 11 to form a pip or hole, generally referred to as a "bit" in the discipline of this invention. The column length within the width dimension 14 will provide a plurality of such bits. Then, by choosing a combination of two such bits, for example, a code may be established which will identify a particular symbol 12 to a physical sensing device. This type of bit sensing is known and used with read-out devices of various kinds.

This invention provides physical sensors for direct reading of the information from a card, and makes possible the efficient reading of the bits within the limited width of the dimension 14. The columns of bits are in lateral relationship with one another, and produce a data band along the card. The sensors pass along the band and reflect the reading in sequence. No memory device is required for accepting a mass of data, nor is there any requirement for scanning devices at the central station to evaluate the signals transmitted. Therefore, alteration of the existing bar-code system is not required. It should be noted that the individual bits of information on the credit card 10 may run together and form a longer bar such as the bar 16 shown in FIGURE 7.

The operating structure is contained within a decorative, enclosing housing 20 which provides a work top and card supporting table surface 22. Guide tracks 24 flank the travel path of a card 10 through the machine, and for this purpose are provided with under-cut notches 25. The guide tracks are aligned across the table, with the notches in opposed position. The notches 25 are dimensioned to accept the card for which it is designed with close confinement, and therefore if a card is warped or otherwise bent, it will be flattened to ride closely upon the top of table 22.

In order to move a card 10 through the positioning and guide means formed by the tracks 24 and the table top 22 efficiently, a drive wheel 27 is positioned to lie in a plane which intersects table 22 between the tracks 24 and in a line extending parallel thereto. The direction of rotation of wheel 27 establishes the direction of card travel.

Although the credit card for which the circuit control device is designed will be of substantially uniform thickness, it is possible by the provision of this invention to accommodate cards of varying thickness. In the illustrated embodiment, accommodations for thickness is accomplished together with positive drive of the card through the sensor device by the provision of a resilient tire around the periphery of drive wheel 27. The illustrated embodiment employs two O rings 29 to provide this function. The O rings extend substantially to the surface of table 22, but are yieldable to permit the card to pass between the wheel and table surface with good friction grip. Alternatively, or in conjunction with a resilient tire, it is acceptable to allow the wheel to yield as well as the tire, or instead of the use of a resilient tire. The object is to obtain tight contact with a card regardless of its thickness, and to drive it through the positioning and guide means without hesitation.

The power to drive wheel 27 is provided by a reduction gear motor 30 operating through a drive shaft 32. In order to avoid the need for manually switching the device on and off, a control switch 34 is built into the table area of the device. Switch 34 has an operating arm 36 which extends through a notch in the table top. Operating arm 36 is urged upwardly to a normally open position by resilient means which is conventional and not illustrated. The arm 36 has a long forward sloping edge extending towards the entrance end of the positioning and guide means and hence will be depressed by a card placed into the track to actuate the switch 34. Power will be supplied to motor 30 as the card is inserted into the area of the wheel 27. The wiring from switch 34 to the motor 30 is conventional, and is not illustrated in the drawing.

The arm 36 has an abrupt end portion 38. As the card passes end 38, arm 36 will move upwardly under resilient means urging the switch to the normally open position. The abrupt rear edge is positioned close to the vertical diameter of wheel 27 in order that a slight coasting of the drive wheel after the arm is released will nevertheless project the card from the grip of the wheel as the power is removed from the motor 30.

A feature of this invention is the sensing of information by a sensor head which is referenced to the surface of the media being read, rather than being referenced to another part of the reading structure. The illustrated embodiment of the invention provides this feature in a sensor head carriage 40 which is a cam follower running upon the card surface on a blunt runner blade. Carriage 40 is built upon a frame 42. The frame 42 is mounted adjacent the table 22 for yieldable movement in a path transverse to the card direction of travel by means of a pivot shaft mounting 44 and a loop spring 46. Spring 46 contacts a fixed surface at one end. The other end is selectively positionable in one of a plurality of holes 48 along the wide portion of frame 42 in order to provide adjustable tension of the sensor head carriage against a card passing through the holding and positioning guide means. The carriage weight and spring tension also aid the tracks 24 in holding a card flat.

Frame 42 is formed with a rounded blunt bottom runner 50, which slides across the surface of a card as the card passes across the table 22 between the guide tracks 24. Thus, regardless of the thickness of a particular card passing through the device, the sensor head carriage 40 will be positioned in exactly the same relative position with respect to the surface of that card. If desired, raised control surfaces in the path of runner 50 may be provided on the card to lift the head carriage away from the surface of the card to control the area of the card subject to sensing. Usually it is desired that the smooth surface of the card adjacent the band of raised bits be employed as a planar reference surface.

Figure 5:
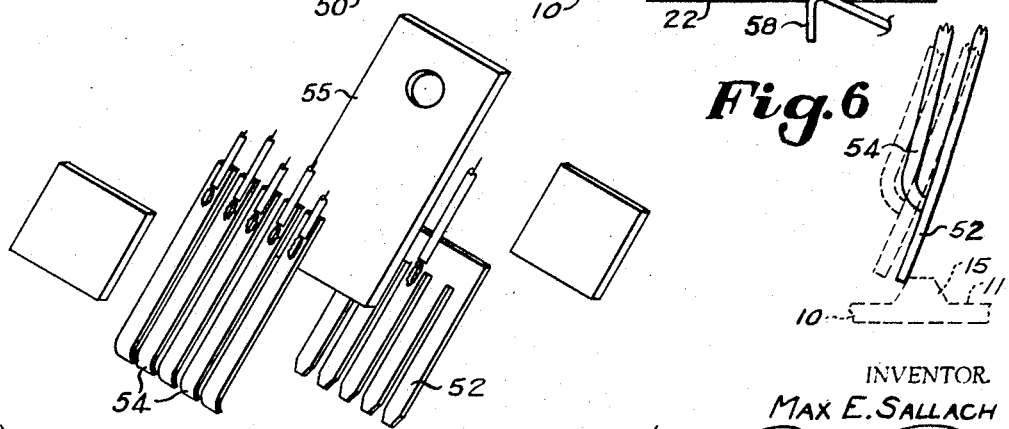
FIGURE 5 illustrates the sensor head in an exploded relationship.
Figure 6:
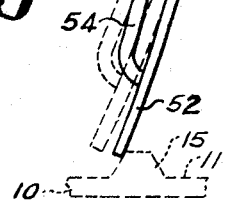
FIGURE 6 illustrates one sensor finger and a related conductor, greatly enlarged in scale with respect to FIGURE 5, in a full contact condition shown in full lines, and further actuated as shown in dotted outline.

This invention employs a uniquely simple and reliable sensing structure which is illustrated in detail in FIGURES 5 and 6. The actual "bit" readers take the form of spring leaf sensor fingers 52. There are five possible "bit" positions on the illustrated credit card 10, and therefore this illustrated embodiment of the invention provides five closely spaced sensor fingers 52, one for each possible embossed "bit" position.

The function of spring sensor fingers 52 is to produce a given circuit condition, and to alter that condition by a change of sensor position produced by a key in the form of a data card. In the illustrated embodiment of the invention, the function of each spring sensor finger 52 is to contact, or be contacted by, a bit 15 and be deflected out of its normal condition for the purpose of establishing a circuit control signal. According to the principles of this invention, it has been discovered that a vertical position for the resilient fingers along a line normal to the path of card travel, creates a maximum deflection upon contact of a bit before sufficient shortening can be obtained to allow the finger to pass over the bit. The greater the inclination of the fingers from vertical, the less the amount they will be deflected as they pass over a bit.

It has been determined that the most useful range for deflection lies substantially within the range of up to 45° from a vertical position, and the direction of this slanting is in the direction of card movement in order that the tip end of the finger may be withdrawn from the card by such deflection. The individual spring sensor fingers are essentially spring cantilevers in that they are mounted at one end and extend unsupported to a free end.

The reverse situation is to carry the fingers elevated as a normal situation and allow deflection by lack of support. An example may be a card with holes.

It has further been discovered that the most useful condition for the sensor fingers 52 is to provide them of such length that the extreme end of each sensor is out of contact with the card being sensed, but at a distance intermediate the normal height of an embossed bit 15. The essential purpose of the runner 50 is to provide a reference to the card surface and hold the fingers properly spaced therefrom. Once the length of the spring sensor finger 52 has been established, the runner 50 will position the ends of the fingers the proper distance from the card surface, regardless of the card thickness or variation within the card. Nevertheless, a slight card variation will be accommodated by the position of the finger ends intermediate the possible height of the bits.

Embossed cards, such as those used in service stations, may be embossed with bits of .016 inch to .018 inch in elevation above the card reference surface. In use, these will flatten somewhat, and may decrease to as little as .010 inch.

The sensors must be able to sense the bit whether it is new and of full height, or old and flattened. However, the sensitivity may not be so great that a slightly bowed card and a surface imperfection can team together to provide a false reading. Hence the preferred embodiment provides for the sensor fingers to project close to the card reference surface, but not to actually ride in contact. This feature prevents false readings but allows for variation of bit height.

As the bits 15 cause deflection of two or more of the sensor fingers 52 according to their position on card 10, they are caused to establish circuitry which is a function of the bit positions and thereby reflect the card conditions.

The illustrated embodiment of the invention accomplishes this response by the provision of a plurality of resilient cantilever conductors 54 which lie in a plane spaced forwardly of the sensors 52. In FIGURE 5 the exploded illustration explains a construction which has provided a practical embodiment of the invention. An insulating foundation board 55 serves as a holder for both the sensors and the conductors. The sensors 52 are of a one piece comb construction to provide a common ground line. By keeping a one piece construction there is no problem of providing a uniform sensor projection.

The conductors 54 are separate from one another and individually wired to a remote controlled circuit. Conductors 54 are shorter than the sensors, and therefore accuracy of projection length to relate to the bits is not required. The selection of the angle of sensor projection is based to some degree upon need for a sensor swing large enough to meet the conductor regardless of the accuracy of its spacing from the surface of the sensor.

The "over-swing" of the sensor is evident in the FIGURE 6. Upon being actuated by a bit, the sensor swings to make contact with the conductor. The dimension and angle of the sensor is such that the distance of swing is greater than that necessary to merely make contact, and the sensor actually swings to the position shown in the dotted outline in the FIGURE 6. The exact amount of this over-swing will be determined by the physical condition of the card bit. This provision of going beyond the contact position assures contact in the event of damaged or badly worn bits, and also causes the end of the conductor to slide along the surface of the sensor. This sliding action keeps the point of the conductor polished free of foreign material which may otherwise tend to insulate the conductor and prevent transmission of a sufficiently strong signal.

As a further convenience to provide a completely self-contained unit requiring the minimum of operative control, power through the fingers and sensors is controlled by means of a switch 56 located under the table 22. An operating arm 58 of switch 56 extends up through table 22 in a construction substantially similar to that of arm 36 of switch 34. Arm 58, when acuated by contact of a card, will establish power for the circuits through the sensors, and when released will determine the end of such power. Hence, by the proper spacing of switch arm 58 from the location of the spring sensor fingers 52, the ability of the sensors to transmit signals may be terminated before the card is transported fully through the device. By this provision, it is possible to limit the transmission of data from the card, and to read-out only over a part of the card surface. Several switches may be used to cause reading of only specified areas of the card.

Hence, it may be desired that a card carry full data on a subject, but only a portion be sensed at a given time for a particular purpose. The beginning and termination of sensor transmission is thus established by switch 56 and the shape of arm 58. For example, data which is pertinent only to a printed form taken from the card may follow in the path of the band of the code data. If the sensors were permitted to read-out this area of the card, a false message will be transmitted. Although the runner 50 may be caused to contact an elevated surface to lift the sensors free of the card and thus prevent further sensing, the placement of the switch as illustrated provides the ability to limit the reading area without alteration of the standard cards in use or placing any restrictions on their configuration. This is accomplished by causing the power circuit to terminate after the card has progressed far enough that the desired data has passed the sensors. Adjustment of the arm 58 in shape and position will alter the exact cut-off point after which the sensors cease to transmit signals.

It will be understood that similar card actuated switching means can also be so located as to prevent the occurrence of sensing in relation to the lead margin of the card if desired.

Whereas the present invention has been shown and described herein in what is conceived to be the mode contemplated, it is recognized that departures may be made therefrom within the scope of the invention which is, therefore, not to be limited to the details disclosed herein, but is to be afforded the full scope of the invention as hereinafter claimed.

What is claimed is:

1. A circuit control device for sensing physical protrusions extending from the surface of a data card, comprising:
   a sensing head carriage;
   positioning guide means for accepting a data card;
   spacer means carried by said sensing head carriage and positioned to ride the surface of a card in said positioning guide means for establishing a precise spacing of said sensing head carriage with respect to a card surface;
   means for causing a relative card scanning movement between said positioning guide means and sensing head carriage with said precise spacing maintained; and
   a composite yieldable finger which is non-conductive under non-stress and conductive when stressed, said finger projecting from said head toward a card held in said positioning guide means, said finger projecting to a terminus positioned out of contact with said card surface a distance less than the height of said protrusions.

2. A circuit control device as defined in claim 1 further characterized in that:
   said card is movable along a path in one direction;
   said head carriage is yieldably urged in a direction transverse to said path; and
   a plurality of said composite yieldable fingers are placed in side-by-side relationship to sense a plurality of protrusion series.

3. A circuit control device as defined in claim 1 further characterized in that:
   said finger extends in the direction of said card movement and at an angle with respect to a line normal to said card surface of not greater than about 45°.

4. A circuit control device for sensing surface configurations of a data card, comprising:
   a table;
   drive means for propelling a data card along a path on said table in a given direction of travel;
   a sensor head carriage mounted adjacent said table for yieldable movement in a path intersecting said path;
   a plurality of spring finger sensors secured at one end to said head carriage, said fingers extending toward said card path and in said given direction of card track at an angle with respect to a line normal to said table surface of not over about 45°;
   a plurality of resilient cantilever conductors lying in a position spaced forwardly of said sensors in said direction of travel, one conductor for each sensor, said conductors spaced and aligned to be contacted by said sensors upon forward swing thereof; and
   a power supply line to said sensors, and one separate line to each conductor,
   whereby card surface irregularities may be used to swing one or more sensor into contact with a corresponding conductor to establish output circuits which reflect the relationship of card surface irregularities.

5. In a circuit control device as defined in claim 4, said drive means comprising:
   a wheel lying in a plane which intersects said table in a line extending in said path of card travel; and
   means to provide a yieldable urge of said wheel toward said table for producing a drive grip upon data cards of all thicknesses.

6. In a circuit control device as defined in claim 4:
   said table having guide track means for holding a data card by the edges thereof in a flat condition against said table and guided in a fixed path with respect to said sensor head carriage.

7. A circuit control system, comprising in combination:

a data card of rectangular configuration having a smooth planar surface with a series of identifying symbols on the surface thereof, each symbol having a code representation of embossed surface bits selected from a plurality of possible bit positions in a column extending from said symbol, said column being restricted to a limited width of said card, and the series of symbols positioned in lateral relationship and generating a bit band of limited width along said card;

a table with positioning and guide means for holding a data card flat to said table surface and providing a channel to enable a card to move along said table surface in a fixed path;

power drive means for propelling a credit card along said table in said fixed path;

a switch in said path actuatable by manual insertion of a credit card in said positioning and guide means for activating said drive means;

a sensor head carriage mounted adjacent said table, means for providing yieldable movement of the carriage in a path transverse to said card direction of travel, a plurality of spring cantilever sensor fingers, one for each said possible embossed bit position, said fingers carried by said head carriage in a lateral array within a width band corresponding to the said card column bit band and extending at an angle of not over substantially 45° from perpendicular in the direction of card travel;

a spacer means carried by said head carriage and positioned to ride said smooth card surface outside of said embossed bit band, said sensor fingers extending into said bit band area and held by said spacer means to position the ends of the fingers intermediate the smooth card surface and the height of said embossed bits; and circuit variable means operable as a function of deflection of said sensor fingers.

8. A circuit control device for sensing physical protrusions from the surface of a data card, comprising:

a sensing head carriage;

positioning guide means for accepting a data card;

means for causing a relative card scanning movement between said data card and sensing head carriage;

the carriage being mounted for movement toward and away from a data card in the course of said relative card scanning movement;

spacer means carried by said sensing head carriage and positioned to ride the surface of a card in said positioning guide means during said relative card scanning movement whereby said spacer means establishes a predetermined spacing of said sensing head carriage with respect to the card surface during the relative card scanning movement, and at least one yieldable finger carried by said sensing head carriage the finger projecting towards a card held in said positioning guide means during said relative card scanning movement and terminating clear of said surface but in position to be contacted by a protrusion thereon, the finger and a conductor determining one circuit condition with the finger out of contact with a protrusion and determining a different circuit condition, when the finger is stressed due to contact with a protrusion during said relative scanning movement.

References Cited

UNITED STATES PATENTS 2,967,916    1/1961    Williams.
3,069,496    12/1962    Blinken et al. ___ 235—61.11 XR

OTHER REFERENCES

Robitschek; RCA TN 504, March 1962.

MAYNARD R. WILBUR, Primary Examiner

SOL SHEINBEIN, Assistant Examiner

U.S. Cl. X.R.

200—46